US012771929B2

(12) United States Patent
Maruta

(10) Patent No.: US 12,771,929 B2
(45) Date of Patent: Oct. 20, 2026

(54) IMAGE CAPTURING APPARATUS, CONTROL METHOD THEREOF, SYSTEM, AND STORAGE MEDIUM

(71) Applicant: CANON KABUSHIKI KAISHA, Tokyo (JP)

(72) Inventor: Hiroki Maruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 99 days.

(21) Appl. No.: 18/889,923

(22) Filed: Sep. 19, 2024

(65) Prior Publication Data

US 2025/0106500 A1 Mar. 27, 2025

(30) Foreign Application Priority Data

Sep. 26, 2023 (JP) ................................ 2023-163578

(51) Int. Cl.
*H04N 23/63* (2023.01)
*G08B 5/36* (2006.01)

(52) U.S. Cl.
CPC ............. *H04N 23/635* (2023.01); *G08B 5/36* (2013.01)

(58) Field of Classification Search
CPC ....... H04N 23/635; H04N 23/698; G08B 5/36
See application file for complete search history.

(56) References Cited

U.S. PATENT DOCUMENTS

| | | | | | |
|---|---|---|---|---|---|
| 11,172,136 | B2 * | 11/2021 | Koga | H04N 23/695 |
| 11,224,404 | B2 * | 1/2022 | Naganawa | A61B 8/0825 |
| 12,132,982 | B2 * | 10/2024 | Kitai | G09G 5/005 |
| 12,542,967 | B2 * | 2/2026 | Yanagibashi | H04N 23/64 |
| 2006/0078329 | A1 * | 4/2006 | Ohnishi | H04N 23/635 348/E7.086 |
| 2010/0149378 | A1 * | 6/2010 | Suzuki | H04N 7/0122 348/240.99 |
| 2021/0058557 | A1 * | 2/2021 | Koga | H04N 23/62 |
| 2024/0040239 | A1 * | 2/2024 | Inazawa | H04N 23/667 |

FOREIGN PATENT DOCUMENTS

| | | | | |
|---|---|---|---|---|
| JP | 2013243624 A | 12/2013 | | |
| JP | 6801618 B2 | * | 12/2020 | H04N 23/60 |

* cited by examiner

*Primary Examiner* — Abdelaaziz Tissire
(74) *Attorney, Agent, or Firm* — Cowan, Liebowitz & Latman, P.C.

(57) ABSTRACT

An image capturing apparatus comprises: an output unit that outputs an image based on a captured image to an external apparatus; a receiving unit that receives a tally signal indicating an image being distributed from the external apparatus; a notification unit; and a control unit that controls the notification unit to perform notification based on the tally signal received by the receiving unit. The control unit controls the notification unit to perform different notifications in a first case where the tally signal received by the receiving unit indicates an image with a first angle of view and in a second case where the tally signal received by the receiving unit indicates an image with a second angle of view different from the first angle of view.

17 Claims, 6 Drawing Sheets

IMAGE CAPTURING APPARATUS, CONTROL METHOD THEREOF, SYSTEM, AND STORAGE MEDIUM

BACKGROUND OF THE INVENTION

Field of the Invention

The present invention relates to an image capturing apparatus, control method thereof, system and storage medium and, more specifically to, a technology for notifying a subject of an image about information regarding the image being distributed.

Description of the Related Art

Conventionally, there was a problem that it was difficult for a subject as a target of image shooting to determine whether or not shooting and distribution were in progress at the shooting site. To address this problem, Japanese Patent Laid-Open No. 2013-243624 discloses a technology that provides an on-air tally lamp that lights up during distribution and a cue tally lamp that lights up when a cue instruction is given, and allows the subject to instantly recognize that shooting and distribution are being performed by the on/off of these lamps.

Meanwhile, image capturing apparatuses each equipped with a function for capturing a full-angle image and a crop function for capturing an image with a narrower angle of view than the full-angle image, and capable of outputting the full-angle image and the cropped image to multiple video terminals have become widely used in recent years.

However, with the technology described in Japanese Patent Laid-Open No. 2013-243624, although the subject can know that shooting and distribution are taking place because the on-air tally lamp and the cue tally lamp light up, the subject cannot distinguish which angle of view of the image is being shot and distributed.

SUMMARY OF THE INVENTION

The present invention has been made in consideration of the above situation, and in a case where one of images with multiple angles of view generated based on images captured by a single image capturing apparatus is selected and distributed, it is possible for the subject to recognize an image with which angle of view is being selected and distributed.

According to the present invention, provided is an image capturing apparatus comprising: an output unit that outputs an image based on a captured image to an external apparatus; a receiving unit that receives a tally signal indicating an image being distributed from the external apparatus; a notification unit; and a control unit that controls the notification unit to perform notification based on the tally signal received by the receiving unit, wherein the control unit controls the notification unit to perform different notifications in a first case where the tally signal received by the receiving unit indicates an image with a first angle of view and in a second case where the tally signal received by the receiving unit indicates an image with a second angle of view different from the first angle of view, and wherein the control unit is implemented by one or more processors and/or circuitry.

Further, according to the present invention, provided is a system comprising: an image capturing apparatus comprising: an output unit that outputs an image based on a captured image to an external apparatus; a receiving unit that receives a tally signal indicating an image being distributed from the external apparatus; a notification unit; and a control unit that controls the notification unit to perform notification based on the tally signal received by the receiving unit, wherein the control unit controls the notification unit to perform different notifications in a first case where the tally signal received by the receiving unit indicates an image with a first angle of view and in a second case where the tally signal received by the receiving unit indicates an image with a second angle of view different from the first angle of view, and the external apparatus, wherein the external apparatus outputs a tally signal indicating an image being distributed, and wherein the control unit is implemented by one or more processors and/or circuitry.

Furthermore, according to the present invention, provided is a control method of an image capturing apparatus comprising: outputting an image based on a captured image to an external apparatus; receiving a tally signal indicating an image being distributed from the external apparatus; and controlling a notification unit to perform notification based on the tally signal received by the receiving unit, wherein the notification unit is controlled to perform different notifications in a first case where the tally signal received by the receiving unit indicates an image with a first angle of view and in a second case where the tally signal received by the receiving unit indicates an image with a second angle of view different from the first angle of view.

Further, according to the present invention, provided is a non-transitory computer-readable storage medium, the storage medium storing a program that is executable by the computer, wherein the program includes program code for causing the computer to execute each process of the control method of an image capturing apparatus, comprising: outputting an image based on a captured image to an external apparatus; receiving a tally signal indicating an image being distributed from the external apparatus; and controlling a notification unit to perform notification based on the tally signal received by the receiving unit, wherein the notification unit is controlled to perform different notifications in a first case where the tally signal received by the receiving unit indicates an image with a first angle of view and in a second case where the tally signal received by the receiving unit indicates an image with a second angle of view different from the first angle of view.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
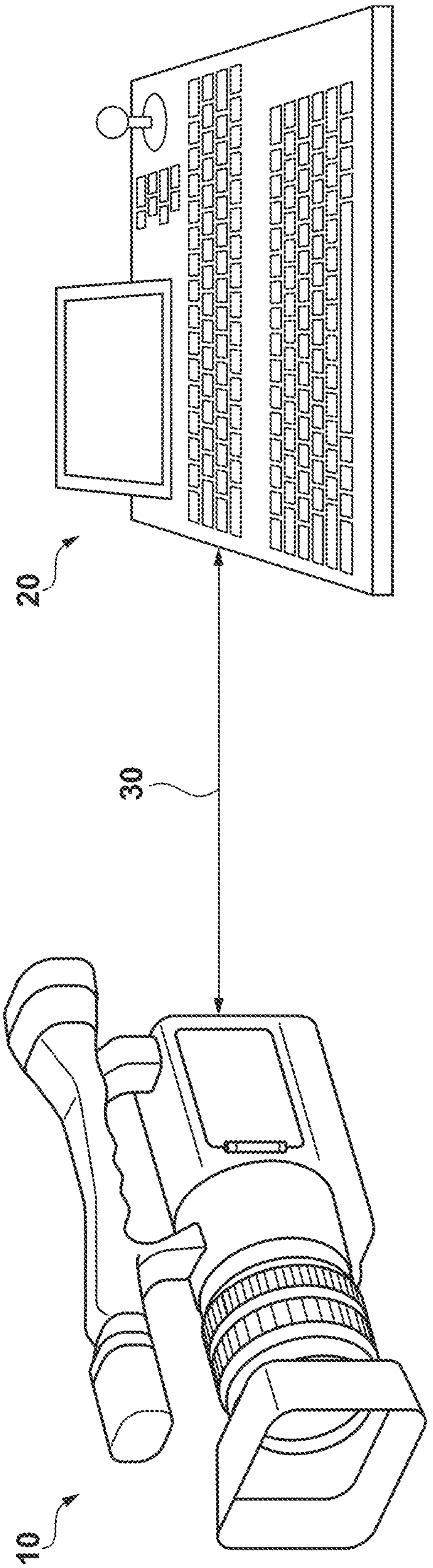
FIG. 1 is a diagram illustrating an image distribution system according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present invention will now be described.

FIG. 1 is a diagram illustrating a schematic configuration of an image distribution system according to the present embodiment, which includes an image capturing apparatus 10 that captures images, and a distribution apparatus 20 that distributes the captured images. The image capturing apparatus 10 and the distribution apparatus 20 are connected via a communication line 30, and images are output from the image capturing apparatus 10 to the distribution apparatus 20 via the communication line 30, and distribution information related to distribution is output from the distribution apparatus 20 to the image capturing apparatus 10.

The communication line 30 is configured so that the image capturing apparatus 10 can receive and distinguish a plurality of types of tally signals included in the distribution information output from the distribution apparatus 20, and may be, for example, a wired communication line or a wireless communication line via an antenna. Furthermore, the image capturing apparatus 10 may be provided with a plurality of contact input terminals, through which the image capturing apparatus 10 accepts binary voltages of on or off from the distribution apparatus 20.

Figure 2:
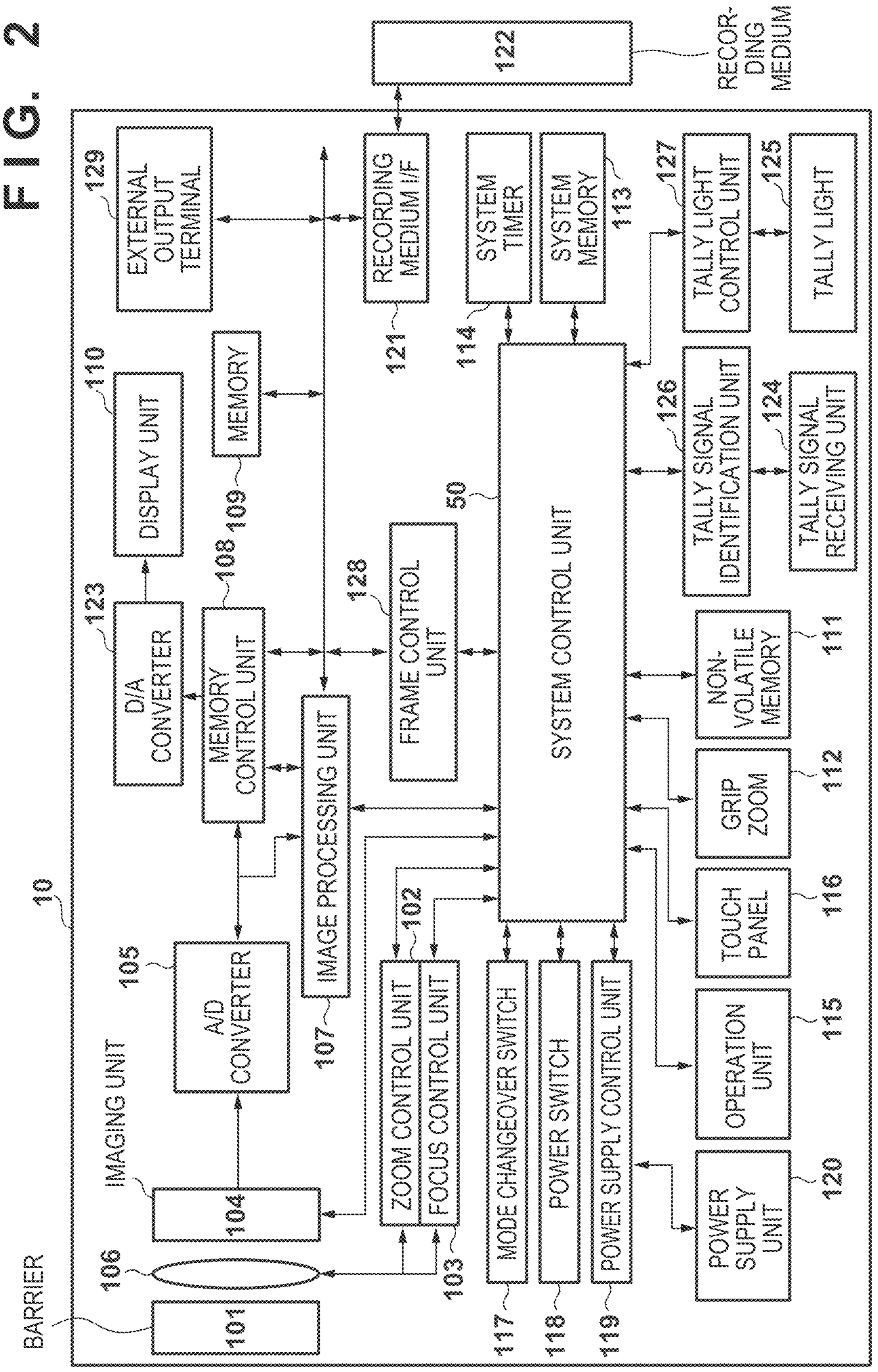
FIG. 2 is a block diagram illustrating an example of a configuration of an image capturing apparatus according to the first embodiment.

FIG. 2 is a block diagram illustrating an example of the configuration of the image capturing apparatus 10.

An imaging lens 106 represents a lens group made up of a plurality of lenses including a zoom lens and a focus lens. The zoom lens is controlled by a zoom control unit 102, and changes the focal length to change the zoom magnification. The focus lens is controlled by a focus control unit 103, and adjusts the focus by moving in the optical axis direction.

An imaging unit 104 is an image sensor that is composed of a CCD, a CMOS device, or the like, that converts an optical image into an electric signal. An A/D converter 105 converts an analog signal output from the imaging unit 104 into a digital signal (image data). A barrier 101 covers the imaging system including the imaging lens 106 of the image capturing apparatus 10 to prevent the imaging system from becoming dirty or damaged.

An image processing unit 107 performs predetermined image processing such as pixel interpolation, resizing such as reduction, and color conversion on image data converted by the A/D converter 105 or image data input via a memory control unit 108. Furthermore, the image processing unit 107 can cut out image data of a partial area set in advance using an operation unit 115 or a touch panel 116 described later, and output the cut-out image data (hereinafter referred to as a "cropped image") in parallel with image data of the full angle of view (hereinafter referred to as a "full-angle-of-view image"). The user can set a crop area, which is an area of the full-angle-of-view image to be cut out and output as a cropped image, by operating an operation unit 115 to select an area in the full-angle-of-view image.

The image processing unit 107 also performs a predetermined calculation using the captured image data, and a system control unit 50 performs exposure control and focus adjustment control based on the calculation results. This allows through-the-lens (TTL) autofocus (AF) processing, autoexposure (AE) processing, and pre-flash (EF) processing to be performed. Furthermore, the image processing unit 107 also performs a predetermined calculation using the captured image data, and performs TTL auto white balance (AWB) processing based on the calculation results.

In addition, the image data from the A/D converter 105 is written to a memory 109 via the image processing unit 107 and the memory control unit 108, or directly via the memory control unit 108 not via the image processing unit 107. The memory 109 stores image data obtained by the imaging unit 104 and converted into digital data by the A/D converter 105, and image data to be displayed on a display unit 110. The memory 109 has a storage capacity sufficient to store a predetermined number of still images and a predetermined period of moving images and audio. The memory 109 also serves as a memory (video memory) for displaying image data read out from a recording medium 122 and on-screen display (OSD) data on the display unit 110.

A D/A converter 123 converts the image data for display stored in the memory 109 into an analog signal and supplies it to the display unit 110. As a result, the display image data written to the memory 109 is displayed on the display unit 110 via the D/A converter 123.

The display unit 110 performs display according to the analog signal supplied from the D/A converter 123 on a display such as a liquid crystal display (LCD). In addition, the digital signal that is once A/D converted by the A/D converter 105 and stored in the memory 109 is converted to an analog signal by the D/A converter 123 and sequentially transferred to the display unit 110 for display, so that the display unit 110 can function as an electronic viewfinder, and a live view image is displayed. In addition, as described later, a display according to a tally signal received by a tally signal receiving unit 124 may be performed. Note that the display unit 110 is not limited to an LCD, and may be, for example, a display of another type such as an organic electroluminescence (EL) display. In addition, although the present embodiment is described as having the display unit 110, an external display device may be connected to an external output unit such as an HDMI (registered trademark) or SDI. Furthermore, the display unit 110 may have a plurality of display output means.

A non-volatile memory 111 is a memory serving as an electrically erasable and recordable recording medium, and, for example, an EEPROM may be used. The non-volatile memory 111 stores constants and programs for the operation of the system control unit 50. These programs are for executing each process of this embodiment, which will be described later.

The system control unit 50 controls the entire image capturing apparatus 10. The system control unit 50 executes programs stored in the non-volatile memory 111 to realize each process of the present embodiment, which will be described later. The system control unit 50 also performs display control by controlling the memory 109, the D/A converter 123, the display unit 110, and so forth.

A system memory 113 is, for example, a RAM, and stores constants and variables for the operation of the system control unit 50, programs read out from the non-volatile memory 111, and so on. A system timer 114 is a time measuring unit that measures the time used for various controls and the time of a built-in clock.

The operation unit 115 is an operating means for inputting various operation instructions to the system control unit 50, and includes various switching buttons such as a menu button, a cancel button, a cross key (up key, down key, left key, right key), a SET key, and various changeover buttons such as a button for switching between AF/MF. For example, when the menu button is pressed, a menu screen on which various settings can be made is displayed on the display unit 110. The user can intuitively make various settings using the menu screen displayed on the display unit 110, the cross key, and the SET key.

The touch panel 116 is a touch sensor that detects various touch operations on the display surface of the display unit 110 (the operation surface of the touch panel 116). The touch panel 116 and the display unit 110 can be configured integrally. For example, the touch panel 116 is configured to have the light transmittance that does not interfere with viewing of the displayed content on the display unit 110, and is attached to the upper layer of the display surface of the display unit 110. By associating input coordinates on the touch panel 116 with display coordinates on the display surface of the display unit 110, a graphical user interface (GUI) that makes as if the user can directly operate the screen displayed on the display unit 110 can be provided.

Using the operation unit 115 and touch panel 116, any partial area for generating a cropped image can be set within the entire light receiving area (full angle of view) of the imaging unit 104. During setting, a frame indicating the partial area being set is displayed on the display unit 110, allowing the user to confirm which area of the image will be output as the cropped image. Note that the frame displayed at this time may be erased after setting, or may be left displayed. Then, in the image processing unit 107, the image of the set partial area is cropped from the full-angle-of-view image, thereby generating a cropped image.

A mode changeover switch 117 changes the operation mode of the system control unit 50 between a moving image shooting mode, a playback mode, and the like.

A grip zoom 112 has a seesaw shape and is operated by being pressed. In the image capturing apparatus 10, a zoom speed (function) is assigned according to the amount of pressing (amount of operation) when the grip zoom 112 is pressed from a reference position. The system control unit 50 detects the amount of pressing of the grip zoom 112, and controls the zoom control unit 102 so as to achieve the zoom speed assigned to the amount of pressing and to change the position of the imaging lens 106. In the grip zoom 112 of this embodiment, the greater the amount of pressing, the greater the amount of voltage change, and the system control unit 50 detects the amount of pressing by detecting the voltage output by the grip zoom 112.

A power switch 118 is a push button for turning the image capturing apparatus 10 on and off.

A power supply control unit 119 is composed of a battery detection circuit, a DC-DC converter, a switch circuit for switching between blocks to be energized, etc., and detects whether a battery is installed, the type of battery, and the remaining battery power. The power supply control unit 119 also controls the DC-DC converter based on the detection results and instructions from the system control unit 50, and supplies the required voltage for the required period to respective units including the recording medium 122.

A power supply unit 120 may be primary batteries such as alkaline batteries or lithium batteries, secondary batteries such as NiCd batteries, NiMH batteries, or Li batteries, an AC adapter, or the like.

A recording medium I/F 121 is an interface with the recording medium 122. The recording medium 122 is a recording medium for recording captured image data, and is composed of a semiconductor memory, a magnetic disk, or the like.

The tally signal receiving unit 124 receives a tally signal from the distribution apparatus 20 via the communication line 30.

A tally signal identification unit 126 acquires the tally signal received by the tally signal receiving unit 124, determines which of the images output to the display unit 110 the tally signal corresponds to, and notifies the determination result of the system control unit 50.

A tally light 125 is a light-emitting unit that lights up when the tally signal receiving unit 124 receives a tally signal. In this embodiment, the tally light 125 is configured with a plurality of LED lights of different colors, and lights up when the LED lights emit light. Alternatively, an external tally light or a tally light that can be connected wirelessly may be used as the tally light 125.

A tally light control unit 127 receives notification of the tally signal information and the corresponding image information from the system control unit 50, and controls the lighting of the tally light 125. In addition, there may be a plurality of pieces of the tally signal information and the corresponding image information notified from the system control unit 50.

A frame control unit 128 receives notification of the tally signal information and the corresponding image information from the system control unit 50, generates a frame based on the tally signal information and the corresponding image information, and displays the generated frame on the display unit 110 in a superimposed manner.

An external output terminal 129 is a terminal that meets the SDI or HDMI (registered trademark) standard, and image data generated by the imaging unit 104 and the image processing unit 107 is output to an external device via the external output terminal 129. The image capturing apparatus 10 has a plurality of output terminals, including an SDI external output terminal and an HDMI external output terminal. Therefore, as an example, the image capturing apparatus 10 can output a full-angle-of-view image and a cropped image, output from the image processing unit 107, to the distribution apparatus 20 via SDI and via HDMI (registered trademark), respectively, in parallel.

Next, tally display processing in the image capturing apparatus 10 in this embodiment will be described with reference to the flowchart in FIG. 3.

Figure 3:
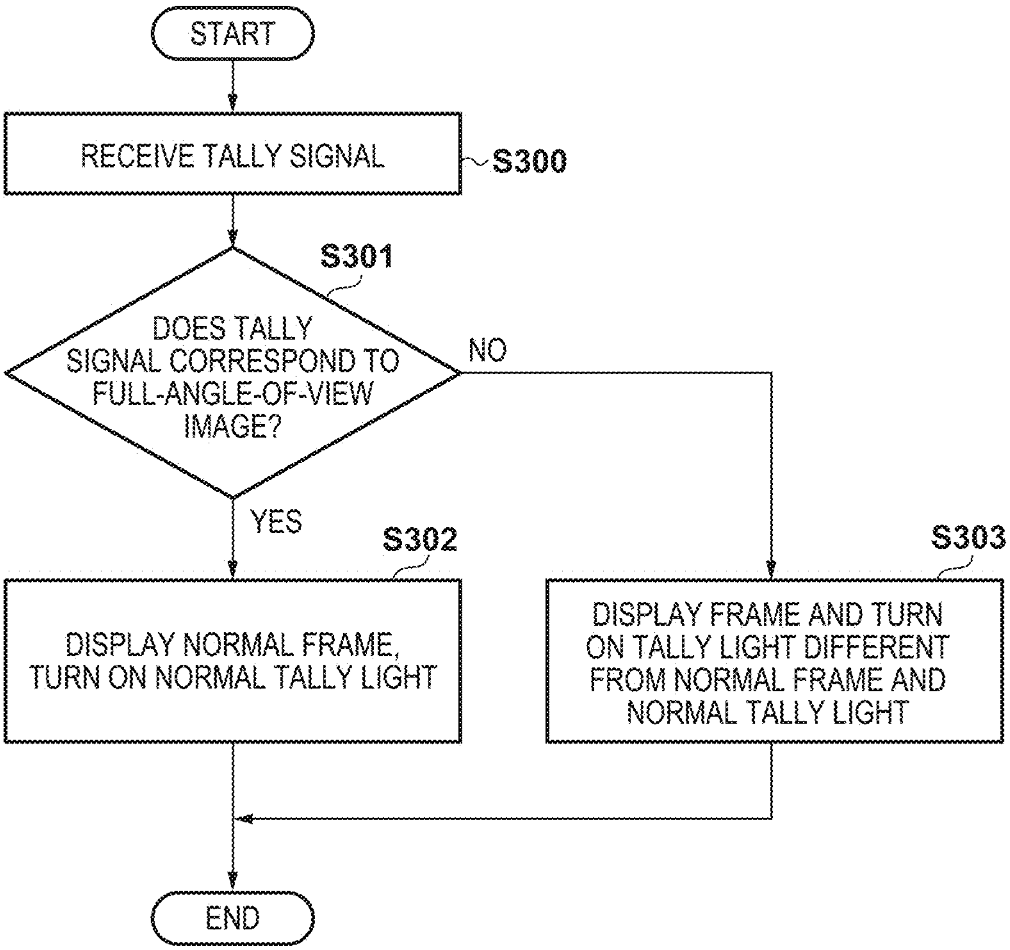
FIG. 3 is a flowchart illustrating tally display processing according to the first embodiment.

The processing of the flowchart in FIG. 3 is realized by the system control unit 50 of the image capturing apparatus 10 executing a program according to this embodiment. Note that all of the processes in the flowchart in FIG. 3 may be realized by a hardware configuration, or part of the processes may be performed by a hardware configuration and the remaining processes may be performed by a software configuration using a program.

In addition, it is assumed that a full-angle-of-view image and a cropped image are output from the image capturing apparatus 10 to the distribution apparatus 20, and one of them is selected and distributed by the distribution apparatus

20, but images may be supplied to the distribution apparatus 20 not only from the image capturing apparatus 10, but also from a plurality of image capturing apparatuses not shown.

First, in step S300, when a tally signal is input to the tally signal receiving unit 124, in step S301, the tally signal identification unit 126 identifies whether the tally signal input in step S300 is a tally signal corresponding to a full-angle-of-view image. The following method is used for identifying the tally signal. The tally signal receiving unit 124 receives identification information, together with the tally signal, as to whether the tally signal corresponds to an image output from an SDI external output terminal or an image output from an HDMI external output terminal. The tally signal identification unit 126 determines an output terminal corresponding to the tally signal based on the identification information, and identifies whether the received tally signal is a tally signal corresponding to a full-angle-of-view image based on whether the image, output from the output terminal corresponding to the tally signal, is a full-angle-of-view image or a cropped image. The identification information may be information related to the type of terminal, such as HDMI (registered trademark) or SDI, or may be information such as output terminal 1 or output terminal 2. Any form of information may be used as long as it is possible to identify which output terminal the tally signal corresponds to. If the tally signal corresponds to a full-angle-of-view image, the process proceeds to step S302, and if the tally signal does not correspond to a full-angle-of-view image, that is, if the tally signal corresponds to a cropped image, the process proceeds to step S303.

If the input tally signal corresponds to a full-angle-of-view image, in step S302, the frame control unit 128 generates a normal frame and displays it on the display unit 110, and the tally light control unit 127 controls the tally light 125 to indicate a normal tally state. As an example of displaying a normal frame, the frame control unit 128 generates a red frame surrounding the full-angle-of-view image and superimposing it on the image on the display unit 110. Also, as an example of indicating the normal tally state, a red LED light of the plurality of LED lights of the tally light 125 is turned on.

On the other hand, if the input tally signal corresponds to a cropped image, in step S303, the frame control unit 128 generates a frame different from the normal frame and displays it on the display unit 110, and the tally light control unit 127 controls the tally light 125 to indicate a tally state different from the normal state. As an example of displaying a frame different from the normal frame, the frame control unit 128 generates a green frame surrounding the periphery of the cropped image and superimposing it on the image on the display unit 110. Also, as an example of indicating the tally state different from the normal state, a green LED light of the plurality of LED lights of the tally light 125 is turned on.

When the process of step S302 or S303 is completed, the tally display processing ends.

Figure 4A:
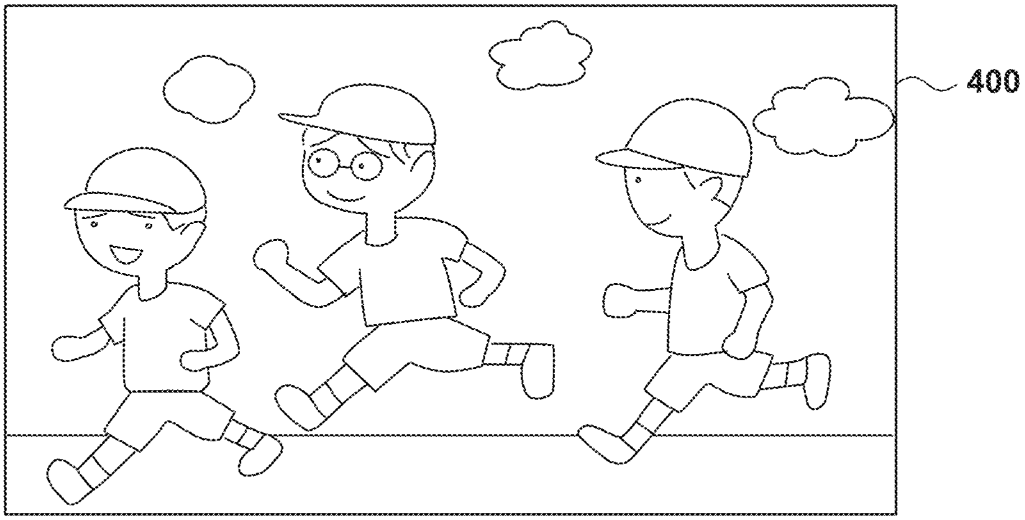
FIGS. 4A and 4B are diagrams illustrating examples of a full-angle-of-view image and of the full-angle-of-view image on which a frame indicating a cropped image is superimposed according to the first embodiment.
Figure 4B:
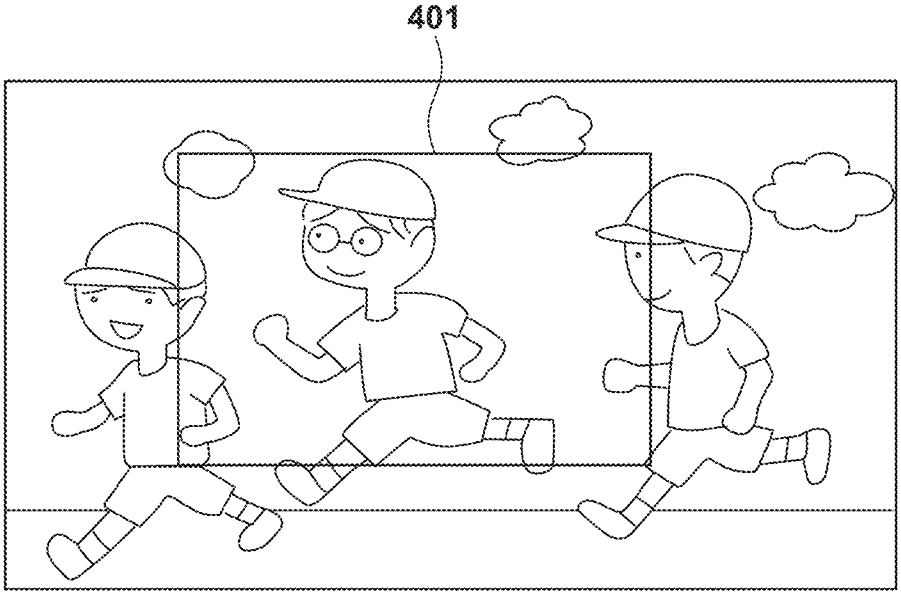

FIG. 4A shows an example of a frame 400 superimposed around a full-angle-of-view image when the received tally signal corresponds to a full-angle-of-view image, and FIG. 4B shows an example of a frame 401 superimposed around a cropped image when the received tally signal corresponds to a cropped image.

As described above, according to the first embodiment, the color of the tally light is changed depending on whether it is determined that a full-angle-of-view image is being distributed or a cropped image is being distributed based on the tally signal. This makes it possible for the subject of the image to recognize which image of which angle of view is being distributed, even when images of multiple angles of view, such as a full-angle-of-view image and a cropped image/images, are output from a plurality of external output terminals.

In the above example, the tally light is lit in red in the normal (full-angle-of-view) tally state, and the full-angle frame is displayed in red similarly to the tally light on the display unit 110, and the tally light is lit in green in the non-normal (cropped image) tally state, and a crop frame is displayed in green similarly to the tally light on the display unit 110. However, the present invention is not limited to this. The color of the tally light and the full-angle-of-view frame or crop frame may be a color other than red or green, and the lighting pattern of the tally light may be changed. In addition, the thickness of the line of the frame displayed on the display unit 110 may be changed, or the type of line of the frame may be changed to a dashed line, a dotted line, or the like. That is, the lighting form of the tally light and the display form of the frame displayed on the display unit 110 are to be different between when a full-angle-of-view image is being distributed and when a cropped image is being distributed based on a tally signal output from the distribution device.

In the above embodiment, the display unit 110 displays the tally state by a frame, but the tally state may be displayed by an icon for displaying tally information. In this case, the display color of the icon for displaying tally information is changed depending on whether a tally signal corresponding to a full-angle-of-view image is received or a tally signal corresponding to a cropped image is received, and the user is notified of the angle of view being distributed by the displayed color of the icon. In addition, the color of the tally light and the color of the tally information display when a tally signal corresponding to a full-angle-of-view image is received are made the same, and the color of the tally light and the color of the tally information display when a tally signal corresponding to a cropped image is received are made the same. By making the colors of the tally light and tally information display the same, it becomes easier to check the angle of view of the image being distributed.

In the above embodiment, when a tally signal is received, the frame 400 surrounding the full-angle-of-view image or the frame 401 surrounding the cropped image is displayed. However, these frames may be displayed not only when a tally signal is received, but also when a tally signal is not received. For example, in response to a crop region being set by the user, the frame 400 surrounding the full-angle-of-view image and the frame 401 surrounding the cropped image indicating the crop region are displayed on the display unit 110 as the angle-of-view information of the image to be output. At this time, the frame 400 is displayed in a color corresponding to the full-angle-of-view image, and the frame 401 is displayed in a color corresponding to the cropped image. When a tally signal corresponding to the full-angle-of-view image is received, the display form of the frame 400 is changed (for example, displayed thicker), and the tally lamp is lit in a color corresponding to the full-angle-of-view image. On the other hand, when a tally signal corresponding to the cropped image is received, the display form of the frame 401 is changed (for example, displayed thicker), and the tally lamp is lit in a color corresponding to the cropped image. By notifying the tally state in this manner, the subject can check the size and position of the cropped image area and the color corresponding to the clipped area in advance from the frame 401 displayed on the display unit 110. In the above explanation, when a tally signal is received, the display form is changed by displaying the frame thicker, but it is also possible to add the text "Distribution in progress" to the display without changing the frame display, or to display an icon indicating that distribution is in progress.

Second Embodiment

Next, a second embodiment of the present invention will be described.

The configurations of the image distribution system and image capturing apparatus in this embodiment are the same as those described in the first embodiment with reference to FIGS. 1 and 2, so a description thereof will be omitted. However, in the second embodiment, it is possible to set a plurality of partial areas using the operation unit 115 and the touch panel 116, and the image processing unit 107 is capable of cropping image data of the plurality of set partial areas and outputting a plurality of cropped images in parallel with the full-angle-of-view image.

Further, in the second embodiment, the distribution apparatus 20 is capable of distributing not only one image but also an image obtained by combining a plurality of images, and outputs a plurality of tally signals corresponding to the plurality of images that compose the distributed image, and the image capturing apparatus 10 is capable of receiving a plurality of tally signals.

In the second embodiment, tally display processing in the above case will be described with reference to the flowchart in FIG. 5.

Figure 5:
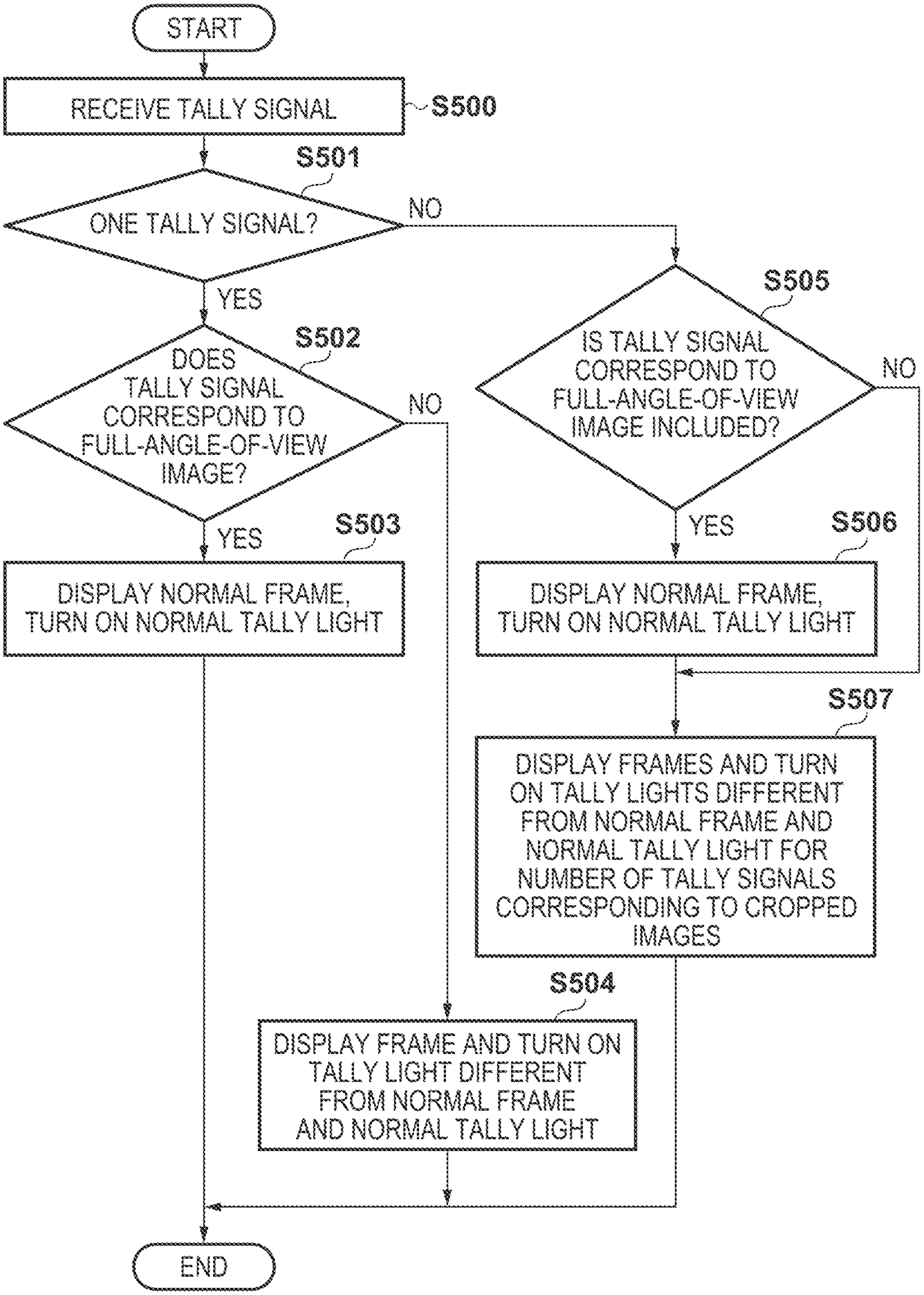
FIG. 5 is a flowchart illustrating tally display processing according to a second embodiment.

The processing of the flowchart in FIG. 5 is realized by the system control unit 50 of the image capturing apparatus 10 executing a program according to this embodiment. Note that all of the processes of the flowchart in FIG. 5 may be realized by a hardware configuration, or part of the processes may be performed by a hardware configuration and the remaining processes may be performed by a software configuration using a program.

In addition, a full-angle-of-view image and a plurality of cropped images are output from the image capturing apparatus 10 to the distribution apparatus 20, and the distribution apparatus 20 selects and distributes one or more of these images. However, images may be supplied to the distribution apparatus 20 not only from the image capturing apparatus 10, but also from a plurality of image capturing apparatuses not shown.

First, in step S500, when a tally signal is input to the tally signal receiving unit 124, in step S501, the tally signal identification unit 126 judges whether or not one tally signal is input in step S500. If one tally signal is received, the process proceeds to step S502, and if a plurality of tally signals are received, the process proceeds to step S505.

In step S502, the tally signal identification unit 126 identifies whether the tally signal input in step S500 is a tally signal corresponding to a full-angle-of-view image. The tally signal input in step S500 may be a tally signal corresponding to a full-angle-of-view image or a tally signal corresponding to each of a plurality of cropped images. If the tally signal corresponds to a full-angle-of-view image, the process proceeds to step S503, and if the tally signal does not correspond to a full-angle-of-view image, that is, if the tally signal corresponds to any one of a plurality of cropped images, the process proceeds to step S504.

In step S503, the same process as in step S302 in FIG. 3 is performed. That is, the frame control unit 128 generates a normal frame and displays it on the display unit 110, and the tally light control unit 127 controls the tally light 125 to show the normal tally state.

On the other hand, if the input tally signal corresponds to any one of a plurality of cropped images, in step S504, a frame different from the normal frame is generated and displayed at the position of the cropped image corresponding to the tally signal of the display unit 110. Furthermore, the tally light control unit 127 controls the tally light 125 to indicate a tally state different from the normal tally state. As an example of displaying a frame different from the normal frame, an image in which a green frame generated by the frame control unit 128 is superimposed around a cropped image corresponding to the tally signal among the plurality of cropped images is displayed on the display unit 110. At this time, a frame of a different color may be set for each cropped image. Furthermore, as an example of indicating a tally state different from the normal tally state, a green LED light among the plurality of LED lights of the tally light 125 is turned on. At this time, different LED light colors may be set for cropped images, and the LED light of a different color may be lit according to the cropped image.

On the other hand, if more than one tally signal are input, in step S505, the tally signal identification unit 126 identifies whether the plurality of received tally signals include a tally signal corresponding to a full-angle-of-view image, and if so, the process proceeds to step S506, and if not, the process proceeds to step S507.

In step S506, similarly to step S503, the frame control unit 128 generates a normal frame and displays it on the display unit 110, and the tally light control unit 127 controls the tally light 125 to show the normal tally state.

In step S507, the frame control unit 128 generates and displays frames different from the normal frame by the number of tally signals corresponding to the cropped images, and the control of indicating different tally states by the tally light 125 is executed in sequence and repeatedly. As an example of displaying frames different from the normal frame, an image in which a yellow frame generated by the frame control unit 128 is superimposed around the cropped image corresponding to the tally signal is displayed on the display unit 110. At this time, if a red frame is superimposed around the entire image display as the normal frame display in step S506, red and yellow frames are displayed. Also, as an example of indicating a different tally state from the normal tally state, a yellow LED light of the plurality of LED lights of the tally light 125 is turned on. At this time, if the red LED light is turned on as the normal display in step S506, a red LED light and the yellow LED light are turned on in sequence and repeatedly.

When the process of step S503, S504 or S507 is completed, the tally display processing ends.

Figure 6A:
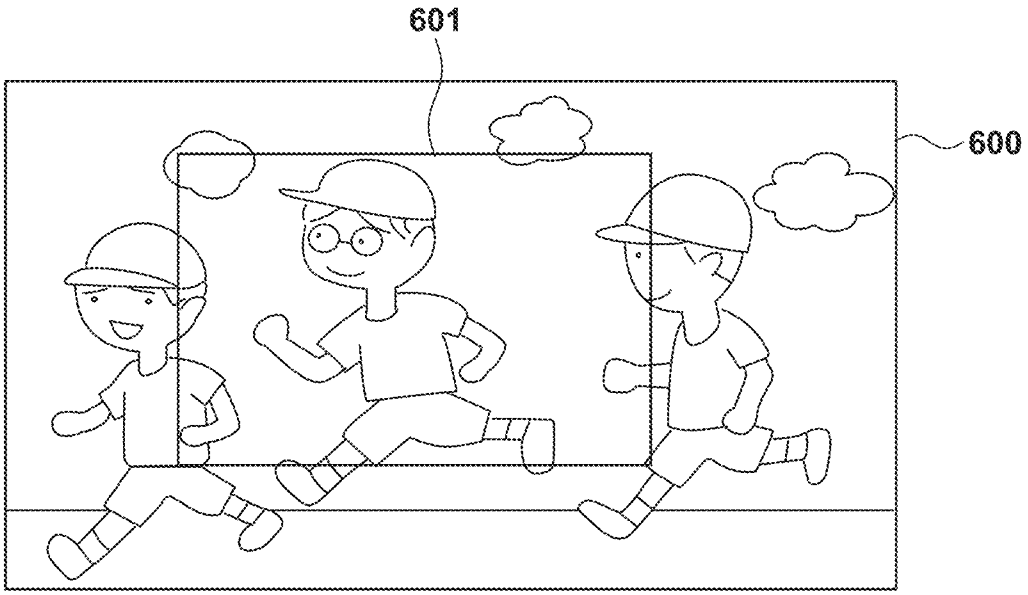
FIGS. 6A and 6B are diagrams illustrating examples of a full-angle-of-view image and of the full-angle-of-view image on which a frame indicating a cropped image is superimposed according to the second embodiment.
Figure 6B:
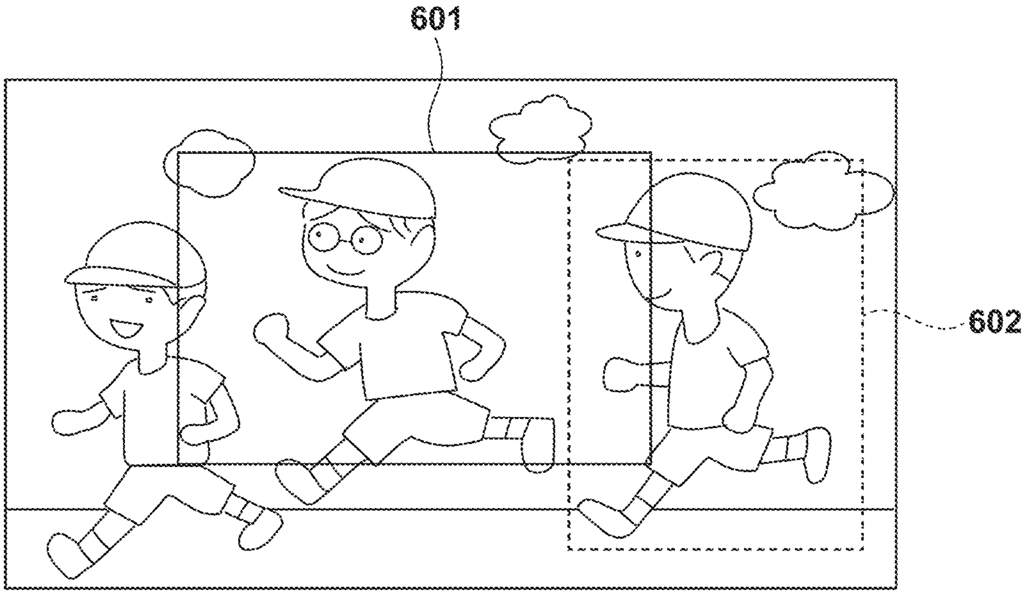

FIG. 6A shows an example in which a frame 600 is superimposed around a full-angle-of-view image and a frame 601 is superimposed around a cropped image when a plurality of tally signals are received and include a tally signal corresponding to the full-angle-of-view image. FIG. 6B shows an example in which frames 601 and 602 are superimposed around a plurality of cropped images when the plurality of tally signals received do not include a tally signal corresponding to a full-angle-of-view image. Note that the frames 601 and 602 may be displayed in the same way, or may be displayed differently, for example, by changing the color or type of line.

As described above, according to the second embodiment, the subject of an image can distinguish between a case where a full-angle-of-view image is being distributed, a case where one cropped image is being distributed, a case where a full-angle-of-view image and at least one cropped image are being distributed, and a case where a plurality of cropped images are being distributed, and to recognize which angle of view image is being distributed.

Further, even when a plurality of images are being distributed at the same time, the photographer can recognize which image of which angle of view is used. Furthermore, by changing the display format, such as the color of frame, it becomes even easier to recognize which image of which angle of view is being distributed.

<Modification>

In the first and second embodiments described above, a cropped image is generated in the image capturing apparatus 10, but it is also possible to generate a cropped image in the distribution apparatus 20.

In that case, when the distribution apparatus 20 distributes a generated cropped image, it transmits a crop signal indicating that information and crop area information indicating the range of the partial area of the cropped image (e.g., the center coordinates and horizontal and vertical lengths of the partial area) to the image capturing apparatus 10. In the image capturing apparatus 10, the tally signal receiving unit 124 receives the crop signal and the crop area information, the tally signal identification unit 126 analyses the information, and the tally light 125 is controlled by the tally light control unit 127 in the same manner as in the first or second embodiment described above. In addition, a frame or frames as shown in FIGS. 4A and 4B or FIGS. 6A and 6B is/are displayed on the display unit 110.

By controlling in this manner, when the image capturing apparatus 10 does not have the ability to simultaneously generate and output a full-angle-of-view image and a cropped image, it is possible to obtain the same effect as in the first and second embodiments by generating a cropped image in the distribution apparatus 20.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-163578, filed Sep. 26, 2023 which is hereby incorporated by reference herein in its entirety.

What is claimed is:

1. An image capturing apparatus comprising:

an output unit that outputs an image based on a captured image to an external apparatus;

a receiving unit that receives a tally signal indicating an image being distributed from the external apparatus;

a notification unit; and a control unit that controls the notification unit to perform notification based on the tally signal received by the receiving unit, wherein the control unit controls the notification unit to perform different notifications in a first case where the tally signal received by the receiving unit indicates an image with a first angle of view which is a full angle of view of the captured image and in a second case where the tally signal received by the receiving unit indicates an image with a second angle of view different from the first angle of view, wherein in a case where a plurality of tally signals are received by the receiving unit, the control unit controls the notification unit to perform different notifications in a third case where the plurality of tally signals indicate an image with the first angle of view and an image with an angle of view different from the first angle of view, and in a fourth case where the plurality of tally signals indicate a plurality of images with a plurality of angles of view different from the first angle of view, and wherein the control unit is implemented by one or more processors and/or circuitry.

2. The image capturing apparatus according to claim 1 further comprising a determination unit that determines an angle of view of an image indicated by the tally signal received by the receiving unit, wherein the control unit controls the notification unit so as to perform notification according to a result of the determination by the determination unit, and wherein the determination unit is implemented by one or more processors and/or circuitry.

3. The image capturing apparatus according to claim 2, wherein the receiving unit receives information about the angle of view of the image being distributed together with the tally signal, and the determination unit determines the angle of view of the image indicated by the tally signal received by the receiving unit based on the information received by the receiving unit.

4. The image capturing apparatus according to claim 1, wherein the second angle of view is an angle of view that corresponds to a partial area of the image with the full angle of view.

5. The image capturing apparatus according to claim 1, wherein the notification unit includes a light-emitting unit, and the control unit controls the light-emitting unit to emit light in different colors and/or lighting patterns in the first case and in the second case.

6. The image capturing apparatus according to claim 1 further comprising a display unit that superimposes angle of view information indicating an angle of view of the image output from the output unit on the captured image.

7. The image capturing apparatus according to claim 6, wherein the display unit displays a frame corresponding to the angle of view in a superimposed manner as the angle of view information.

8. The image capturing apparatus according to claim 7 further comprising one or more second output units, wherein the output unit and the second output unit or units are capable of outputting images obtained from the captured image and having different angles of view to an external apparatus, respectively, and the display unit displays frames indicating the angles of view of the images output from the output unit and the second output unit or units in different display forms, superimposed on the captured image.

9. The image capturing apparatus according to claim 8 further comprising a designation unit that designates an angle of view of an image to be output to each of the output unit and the second output unit or units.

10. The image capturing apparatus according to claim 1 further comprising:

an image capturing unit that captures an image; and a generating unit that generates a second image with the second angle of view based on a first image with the first angle of view captured by the image capturing unit, wherein the output unit outputs the first image and the second image to an external apparatus, and the generating unit is implemented by one or more processors and/or circuitry.

11. The image capturing apparatus according to claim 1, wherein the external apparatus generates a second image with a different angle of view from a first image output from the output unit of the image capturing apparatus based on the first image, and the receiving unit receives information indicating the angle of view of the second image from the external apparatus.

12. An image capturing apparatus, comprising, output units that output images obtained from a captured image and having different angles of view to an external apparatus;

a receiving unit that receives a tally signal indicating an image being distributed from the external apparatus;

a notification unit;

a control unit that controls the notification unit to perform notification based on the tally signal received by the receiving unit; and a display unit that superimposes frames corresponding to the angles of view of the images output from the output units as angle of view information in a superimposed manner on the captured image, wherein the control unit controls the notification unit to perform different notifications in a first case where the tally signal received by the receiving unit indicates an image with a first angle of view and in a second case where the tally signal received by the receiving unit indicates an image with a second angle of view different from the first angle of view, wherein, in a case where the image with the first angle of view and the image with the second angle of view are output from the output units, the display unit displays the angle of view information indicating the first angle of view in a first display form, and displays the angle of view information indicating the second angle of view in a second display form, and the control unit controls the notification unit to perform notification in a format corresponding to the first display form in the first case, and controls the notification unit to perform notification in a format corresponding to the second display form in the second case.

13. The image capturing apparatus according to claim 12, wherein the first display form and the second display form are display forms having different display colors, and the control unit controls the notification unit to notify in a color corresponding to the first display form in the first case, and controls the notification unit to notify in a color corresponding to the second display form in the second case.

14. The image capturing apparatus according to claim 12, wherein the first angle of view is the angle of view of the image displayed on the display unit, and the second angle of view is the angle of view corresponding to a partial area of the image with the first angle of view.

15. A system comprising:

an image capturing apparatus comprising:

an output unit that outputs an image based on a captured image to an external apparatus;

a receiving unit that receives a tally signal indicating an image being distributed from the external apparatus;

a notification unit; and a control unit that controls the notification unit to perform notification based on the tally signal received by the receiving unit, wherein the control unit controls the notification unit to perform different notifications in a first case where the tally signal received by the receiving unit indicates an image with a first angle of view which is a full angle of view of the captured image and in a second case where the tally signal received by the receiving unit indicates an image with a second angle of view different from the first angle of view, and the external apparatus, wherein in a case where a plurality of tally signals are received by the receiving unit, the control unit controls the notification unit to perform different notifications in a third case where the plurality of tally signals indicate an image with the first angle of view and an image with an angle of view different from the first angle of view, and in a fourth case where the plurality of tally signals indicate a plurality of images with a plurality of angles of view different from the first angle of view, wherein the external apparatus outputs a tally signal indicating an image being distributed, and wherein the control unit is implemented by one or more processors and/or circuitry.

16. A system, comprising an image capturing apparatus comprising:

an output unit that outputs an image based on a captured image to an external apparatus;

a receiving unit that receives a tally signal indicating an image being distributed from the external apparatus;

a notification unit; and a control unit that controls the notification unit to perform notification based on the tally signal received by the receiving unit, wherein the control unit controls the notification unit to perform different notifications in a first case where the tally signal received by the receiving unit indicates an image with a first angle of view and in a second case where the tally signal received by the receiving unit indicates an image with a second angle of view different from the first angle of view, and the external apparatus, wherein the external apparatus outputs a tally signal indicating an image being distributed, wherein, in a case where a plurality of images are combined and distributed as an image, the external apparatus outputs a plurality of tally signals indicating the plurality of images being distributed, and wherein the control unit is implemented by one or more processors and/or circuitry.

17. A control method of an image capturing apparatus comprising:

outputting an image based on a captured image to an external apparatus;

receiving a tally signal indicating an image being distributed from the external apparatus; and controlling a notification unit to perform notification based on the tally signal received by the receiving unit, wherein the notification unit is controlled to perform different notifications in a first case where the tally signal received by the receiving unit indicates an image with a first angle of view which is a full angle of view of the captured image and in a second case where the tally signal received by the receiving unit indicates an image with a second angle of view different from the first angle of view, wherein in a case where a plurality of tally signals are received by the receiving unit, the notification unit is controlled to perform different notifications in a third case where the plurality of tally signals indicate an image with the first angle of view and an image with an angle of view different from the first angle of view, and in a fourth case where the plurality of tally signals indicate a plurality of images with a plurality of angles of view different from the first angle of view.

* * * * *